United States Patent [19]

Bregeault et al.

[11] 4,129,808

[45] Dec. 12, 1978

[54] ELECTRONIC CONTROL ARRANGEMENT WHICH CAN BE USED IN PARTICULAR FOR DRIVING A BRUSHLESS AND SLIP-RINGLESS MOTOR AND AN INSTALLATION INCORPORATING SUCH AN ARRANGEMENT

[75] Inventors: Marc Bregeault; Jacques Lecoeuche; Pierre Margrain, all of Colombes, France

[73] Assignee: Auxilec, Colombes, France

[21] Appl. No.: 805,453

[22] Filed: Jun. 10, 1977

[30] Foreign Application Priority Data

Jun. 15, 1976 [FR] France .................. 76 18124
Jan. 18, 1977 [FR] France .................. 77 01331

[51] Int. Cl.² .......................................... H02K 29/00
[52] U.S. Cl. ................................... 318/254; 363/137
[58] Field of Search ............. 363/131, 137; 318/254, 318/138; 323/119

[56] References Cited

U.S. PATENT DOCUMENTS

| | | | |
|---|---|---|---|
| 3,575,549 | 4/1971 | Hepner | 323/119 UX |
| 3,612,973 | 10/1971 | Kuniyoshi | 318/254 |
| 3,919,619 | 6/1974 | Corry | 363/137 |

Primary Examiner—Herman J. Hohauser
Attorney, Agent, or Firm—Cushman, Darby & Cushman

[57] ABSTRACT

An electronic control arrangement which can be used in particular for driving brushless and slip-ringless electric motors and an installation incorporating such an arrangement. The speed of the motor is controlled as a function of one of more items of information such as temperatures for example. For this purpose, a DC control voltage proportional to the items of information received is produced. By combining a mixing arrangement, a processing block, a function generator and a power-amplifier stage it becomes possible to obtain from the output of the arrangement, from a source of DC electrical energy, two sinusoidal voltages of the same amplitude and frequency which are 90° out of phase with one another and whose frequency and amplitude are proportional to the DC control voltage.

11 Claims, 17 Drawing Figures

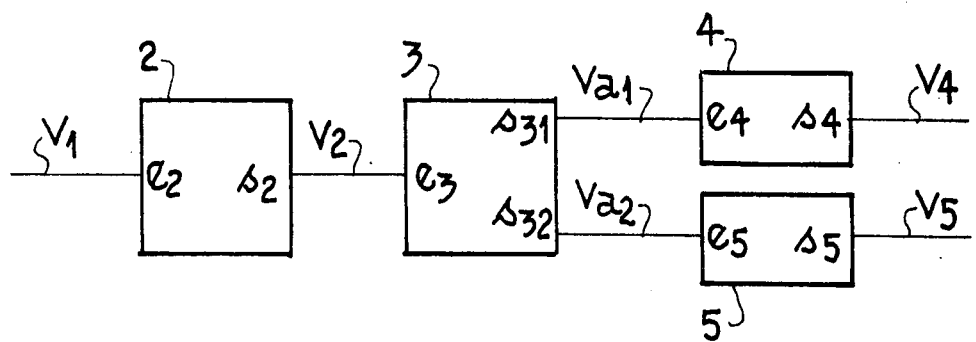
FIG_1
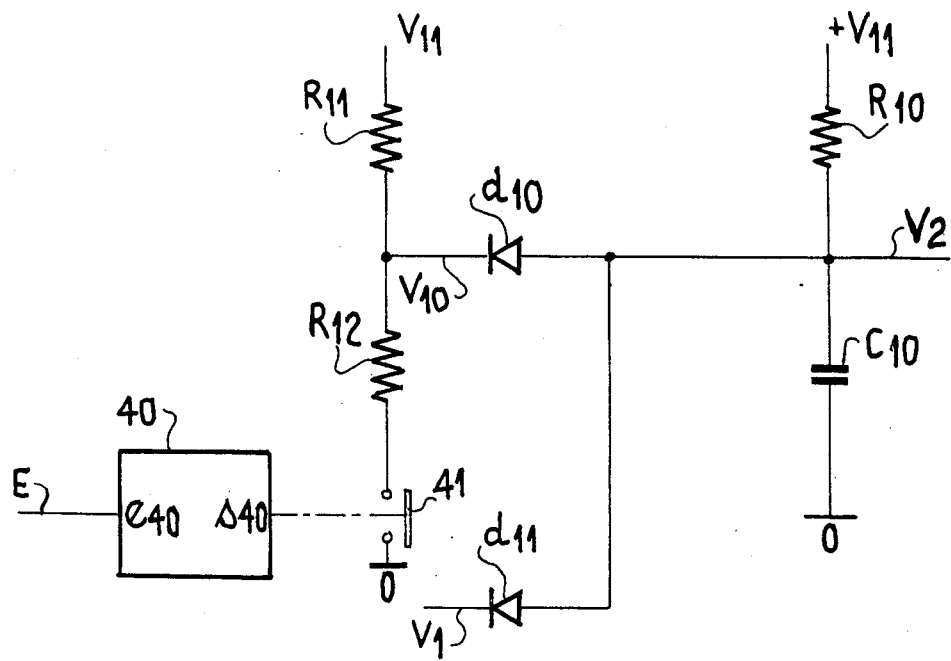
FIG_2

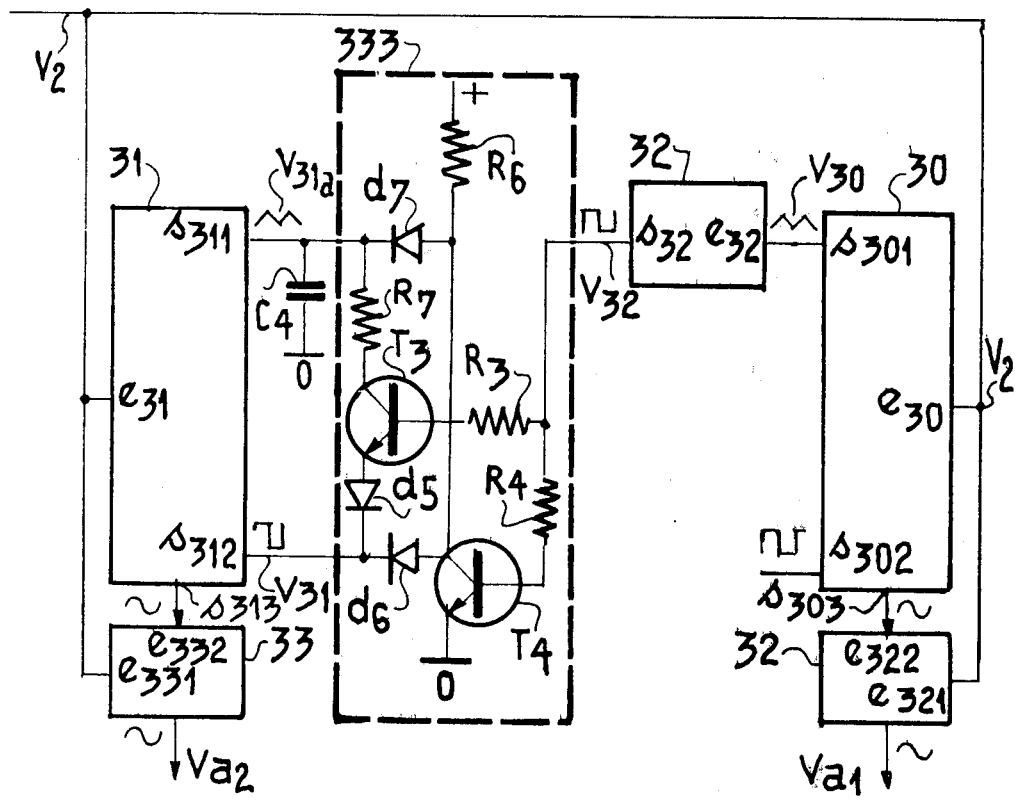
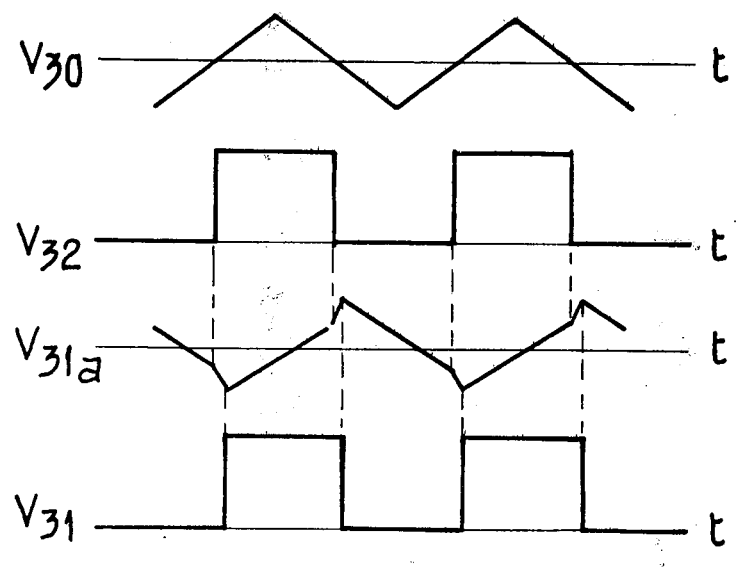

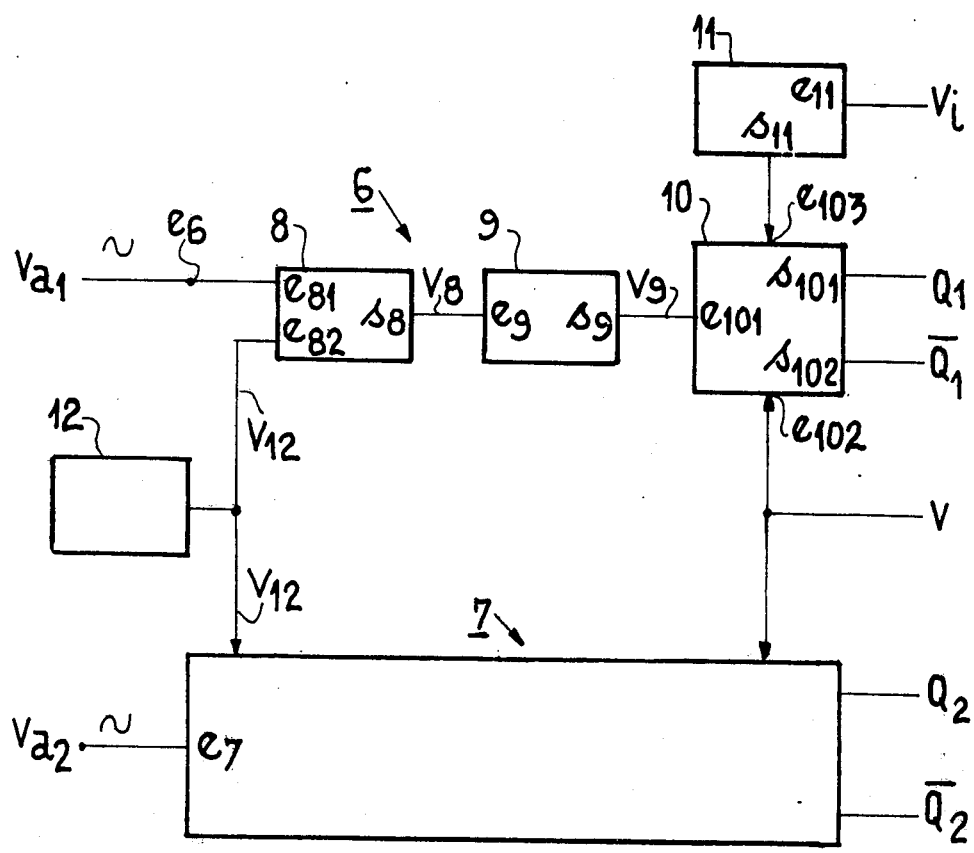

FIG_6
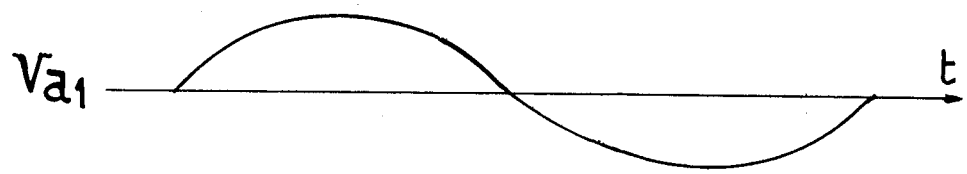
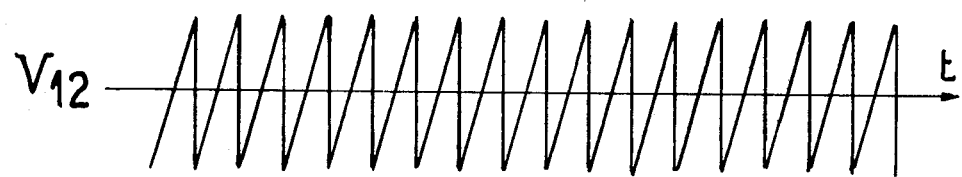
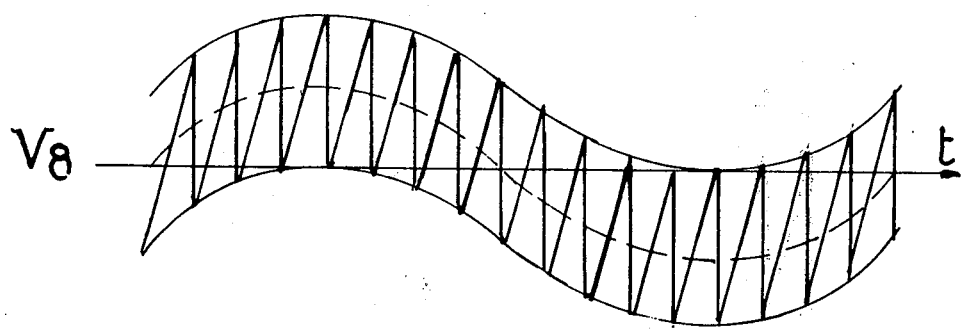
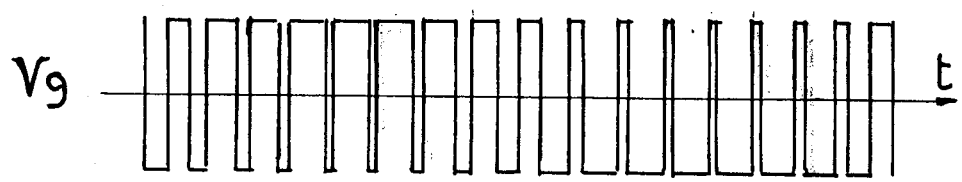
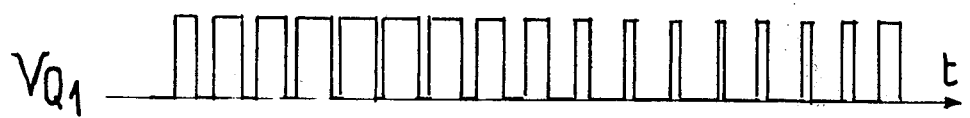

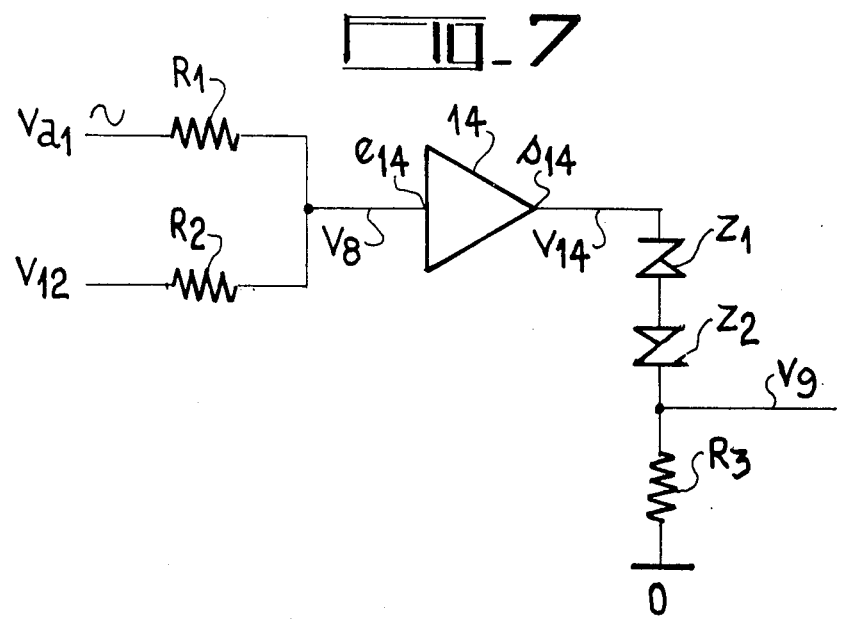
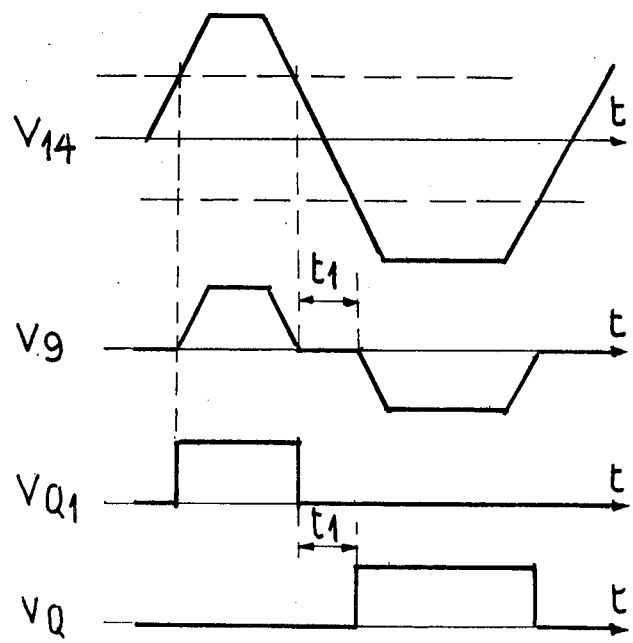

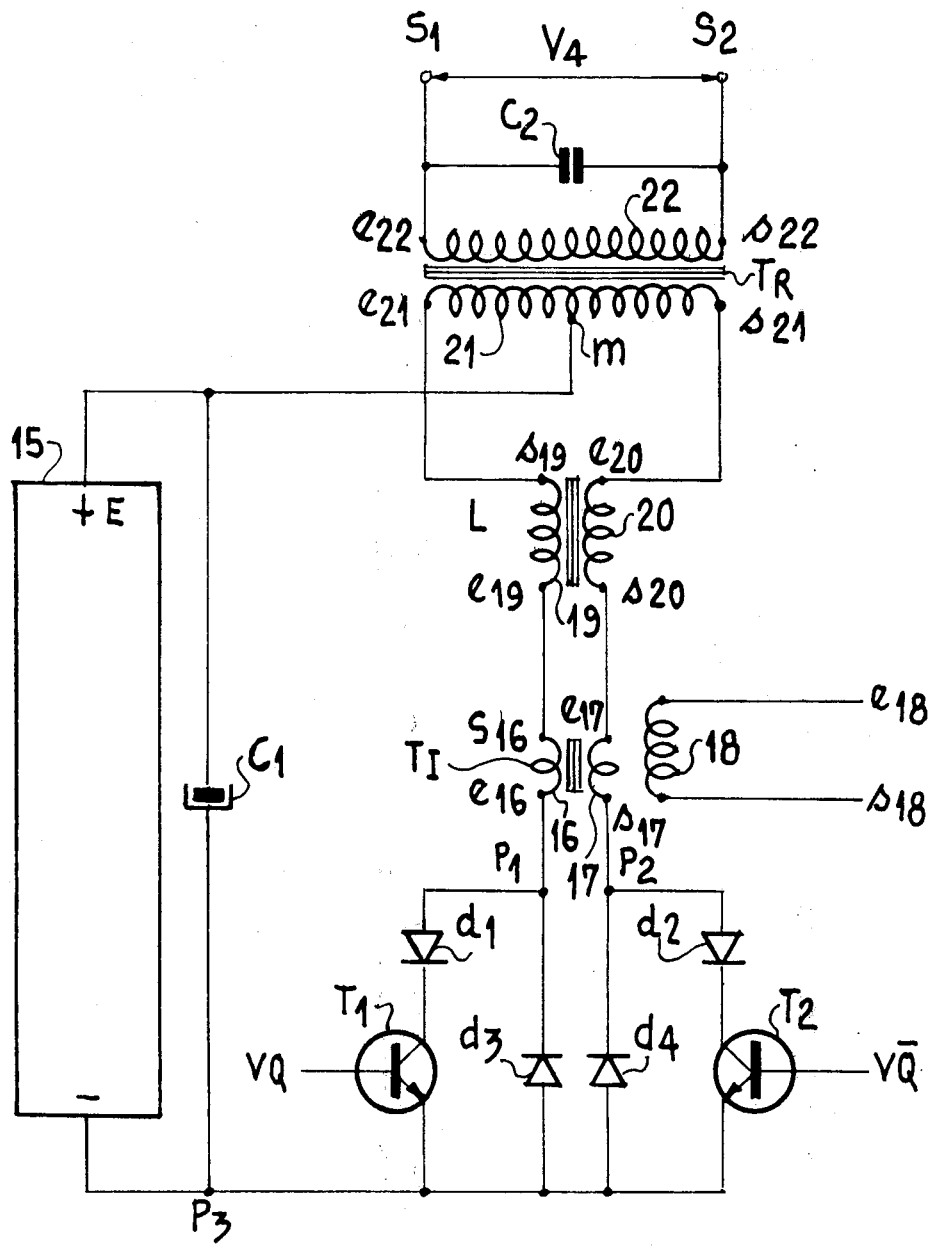

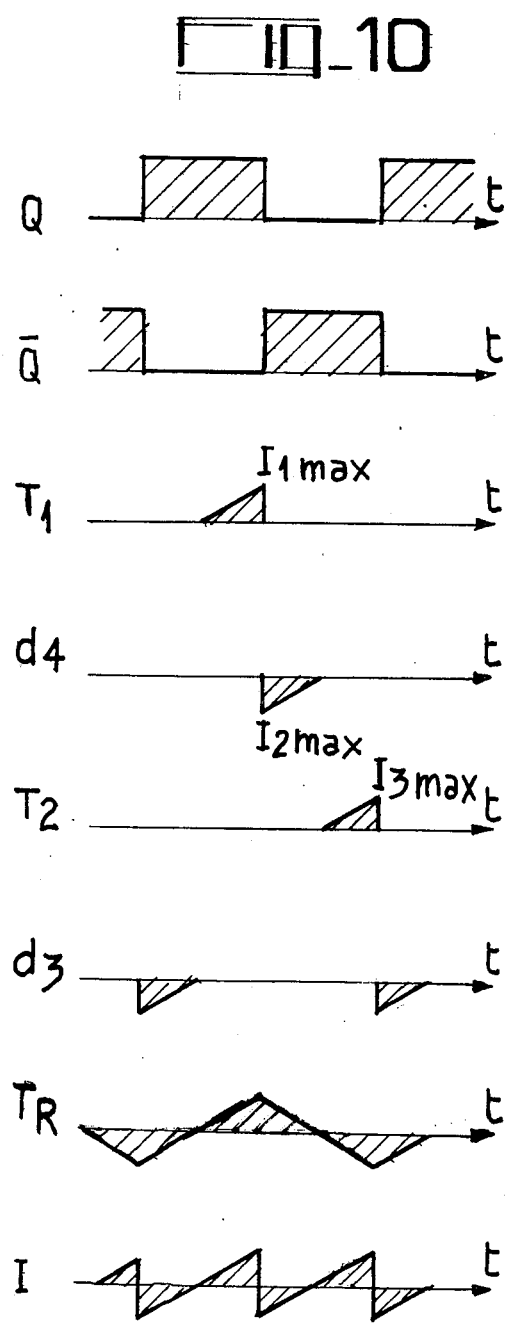

Fig. 11
Q
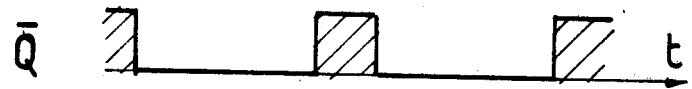
$\bar{Q}$
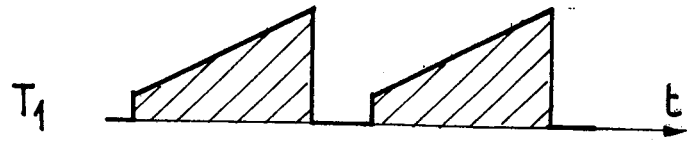
$T_1$
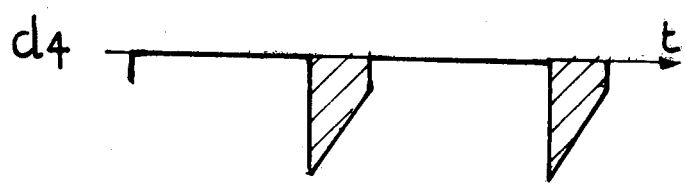
$d_4$
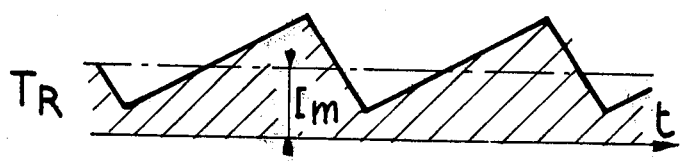
$T_R$    $I_m$
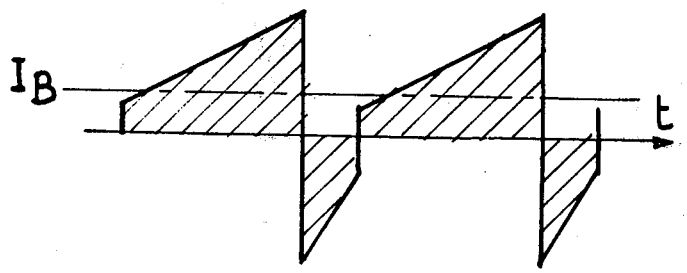
$I_B$

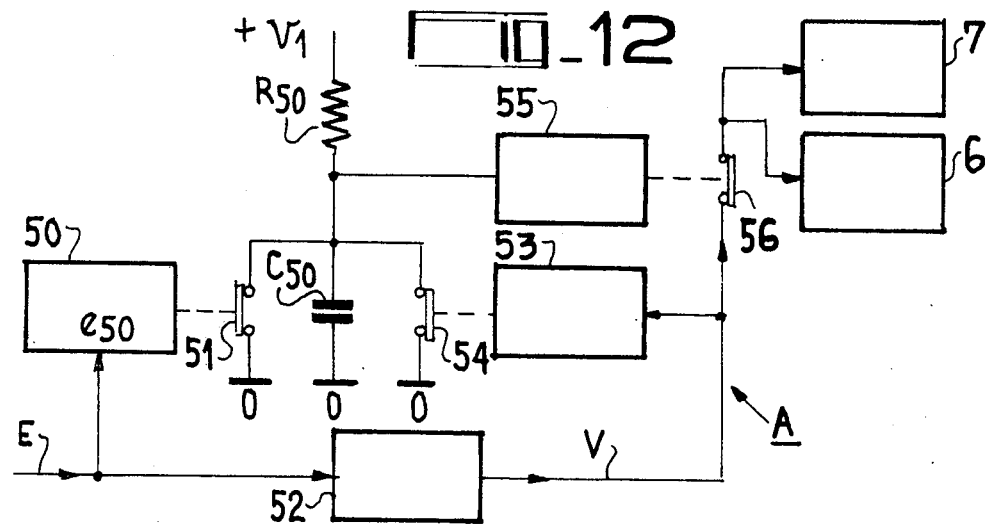
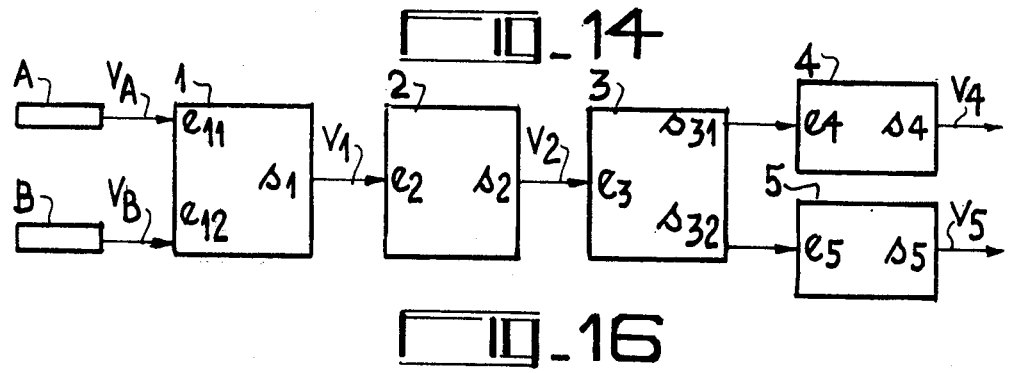
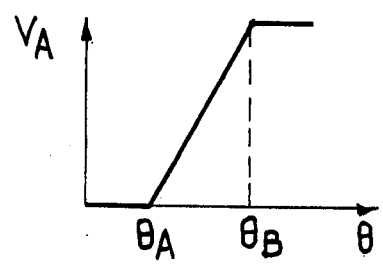
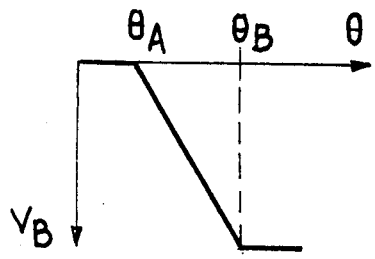

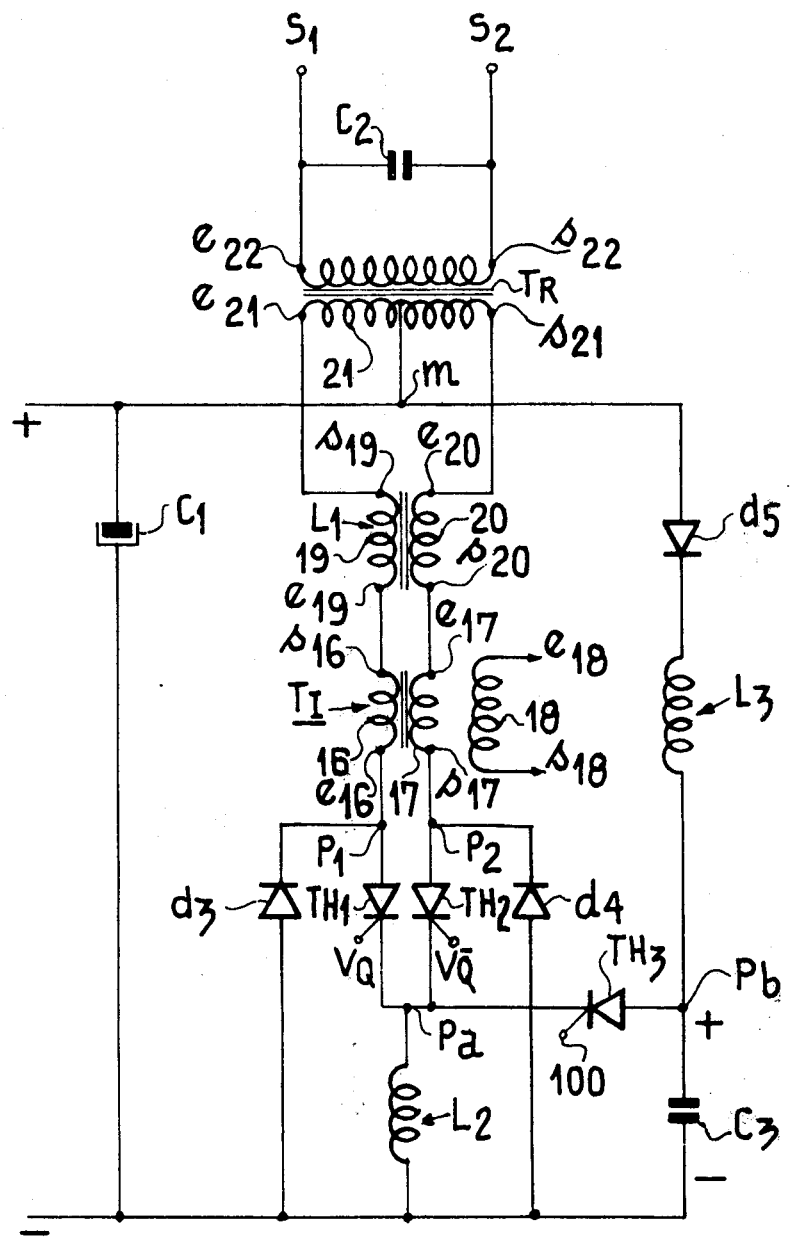

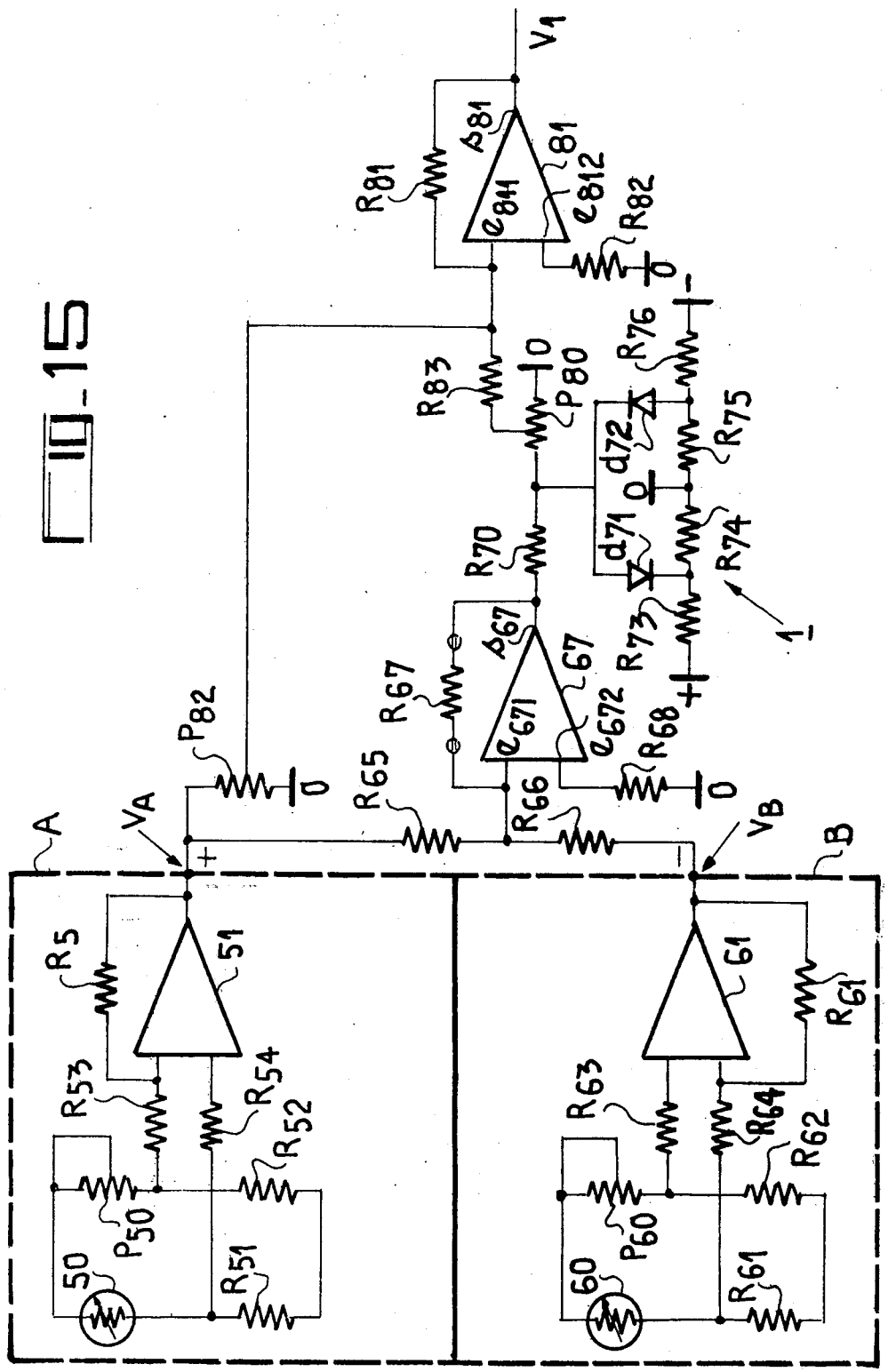

ELECTRONIC CONTROL ARRANGEMENT WHICH CAN BE USED IN PARTICULAR FOR DRIVING A BRUSHLESS AND SLIP-RINGLESS MOTOR AND AN INSTALLATION INCORPORATING SUCH AN ARRANGEMENT

This invention relates to a control arrangement which can be used in particular for driving electric motors having neither brushes or slip-rings and more particularly two-phase or three-phase asynchronous motors. It relates to such an arrangement which receives at its input a control signal in the form of a DC voltage and which delivers from its output, as a function of the latter and from a source of DC energy, two sinusoidal voltages of variable frequency which are out of phase with one another. These sinusoidal voltages, whose frequency can be varied continuously and whose voltage is at all times proportional to frequency, may supply a load such as an asynchronous motor, thus performing the function of a drive system which enables the motor to operate at continuously variable speeds. The invention also relates to an installation for ventilating an enclosure such as a railway passenger coach with regulation as a function of inside and outside temperatures, the said installation including a blower which is operated by at least one brushless and slip-ringless asynchronous electric motor equipped with such an arrangement.

Control systems at present in use to achieve this object will only operate at certain predetermined power factors. As a result, it is necessary to provide capacitor compensation matched to each frequency.

The present invention has as an object to overcome these disadvantages and relates to a control arrangement which forms a generator generating power in the form of two out of phase sinusoidal voltages. The frequency and amplitude of these two voltages are proportional to a low-power control voltage. By virtue of the construction of the various stages forming the arrangement and more particularly that of the power-amplifying stage, the arrangement is able to operate with loads of any power factor and to do so with excellent efficiency.

The invention will be better understood from the following explanation and from the accompanying figures, of which:

FIG. 1, is a schematic view of the layout of the various constituent parts of a control arrangement according to the invention;

FIG. 2, shows an embodiment of the information processing block referenced 2 in FIG. 1;

FIG. 3, shows an embodiment of the function generator referenced 3 in FIG. 1;

FIG. 4, shows signal waveforms illustrating the operation of the function generator;

FIG. 5, shows an embodiment of a preamplifier which co-operates with one of the power amplifiers referenced 4 and 5 in FIG. 1;

FIG. 6, shows signal waveforms illustrating the operation of the preamplifier;

FIGS. 7 and 8 are respectively a detail view of an embodiment of preamplifier and an illustration of its manner of operation;

FIG. 9, shows an embodiment of the power amplifier referenced 4 in FIG. 1;

FIGS. 10 and 11 illustrate the operation of the said preamplifier (power amplifier);

FIG. 12, shows an embodiment of an auxiliary safety circuit;

FIG. 13, is a circuit diagram for an embodiment of thyristorised power amplifier according to the invention;

FIG. 14, is a general diagram of a control arrangement according to the invention which incorporates an additional mixing arrangement which co-operates with the said control arrangement when the application is to the ventilation of a coach;

FIG. 15, when supplemented by FIGS. 16 and 17, shows an embodiment of the mixing arrangement of FIG. 14 and illustrates its operation.

To simplify the description, similar components bear the same reference numerals in all of the figures.

FIG. 1 shows the overall combination of the chief components, each of which has one function to perform, these components co-operating with one another to enable the arrangement according to the invention to emit from its output two out of phase sinusoidal voltages which are capable of regulating the speed of an asynchronous motor whose electric energy source is a DC source.

A first control voltage $V_1$, obtained by taking account of given parameters, is applied to the input $e_2$ of a block 2 for processing the control signal. At its output $s_2$ the latter produces a second DC voltage $V_2$ which in turn is applied to the input $e_3$ of a function generator 3 which, from its two outputs $s_{31}$ and $s_{32}$, generates first and second sinusoidal voltages which are out of phase by 90° and whose amplitude and frequency are proportional to the control voltage $V_2$. The first sinusoidal voltage $V_{a1}$ is applied to the input $e_4$ of a first power amplifier 4 and the second sinusoidal voltage $V_{a2}$ to the input $e_5$ of a second power amplifier 5 which is edentical to the first. This produces at outputs $s_4$ and $s_5$ of the amplifiers two sinusoidal voltages which are replicas of the voltages applied to their inputs $e_4$ and $e_5$ but from which power is available, as will be explained in the further course of the description. These two output voltages are thus 90° out of phase and their amplitude and frequency are proportional to the Dc control voltage $V_2$ supplied by the function generator 3. These two output voltages $V_4$ and $V_5$ supply a load which, in one given application, is a two-phase asynchronous motor without brushes or slip-rings.

Having described the general organisation of a control arrangement according to the invention as illustrated in FIG. 1, the various components will now be described one by one from the point of view of structure and operation.

A processing block 2, of which one embodiment and the corresponding manner of operation are described below, is illustrated by FIG. 2. It receives the control signal $V_1$. Such a block consists of a capacitor $C_{10}$, a load resistor $R_{10}$ and two diodes $d_{10}$ and $d_{11}$ whose commoned anodes are connected to capacitor $C_{10}$ and whose cathodes receive the control voltage $V_1$ in the case of diode $d_{11}$ and a voltage $V_{10}$, supplied by a voltage divider formed by two resistors $R_{11}$ and $R_{12}$, in the case of diode $d_{10}$. The arrangement also includes a threshold system 40 which receives at its input $e_{40}$ the voltage E from the supply source. This threshold system 40 closes a contact 41 as soon as the voltage from the supply battery drops below a certain predetermined level (72 volts for example in the case of a battery whose rated voltage is 80 volts). This contact 41 brings into operation the voltage divider $R_{11}$ and $R_{12}$, which is fed by a voltage $V_{11}$. The voltage $V_2$ at the terminals of capacitor $C_{10}$ represents the voltage which is applied to input $e_3$ of the function generator 3 which will be described below. Capacitor $C_{10}$ charges through resistor $R_{10}$ to voltage $V_2$. The control voltage $V_2$ rises following a linear ramp law. If the voltage from the supply battery is higher than the triggering threshold, contact 41 is open, voltage $V_{10}$ is equal to $V_{11}$ and diode $d_{10}$ is blocked. When voltage $V_2$ reaches the value $V_1$, diode $d_{10}$ becomes conductive and limits the charge in capacitor $C_{10}$ to the value $V_1$. If the voltage from the supply battery is lower than the triggering threshold of the threshold system 40, contact 41 closes and voltage $V_{10}$ is then set by the divider formed by the two resistors $R_{11}$ and $R_{12}$ and becomes less than voltage $V_1$. Diode $d_{10}$ becomes conductive whilst diode $d_{11}$ blocks, and voltage $V_2$ assumes the value $V_{10}$. This limits the frequency and the voltage delivered by the function generator 3.

FIG. 3 shows an embodiment of this function generator, which referenced 3 in FIG. 1. It is formed by two function-generating integrated circuits 30 and 31. These two circuits are controlled from their respective inputs $e_{30}$ and $e_{31}$ by the same DC voltage $V_2$ supplied by the information processing block 2. From its first output $s_{301}$, its second output $s_{302}$ and its third output $s_{303}$, circuit 30 emits respectively an asymmetrical triangular wave signal, an asymmetrical square wave signal, and a sinusoidal signal. All these signals are in phase and their frequency is proportional to the control voltage $V_2$.

The same signals are emitted from respective outputs $s_{311}$, $s_{312}$ and $s_{313}$ of circuit 31, but the frequency of these latter signals, which is always proportional to the control voltage $V_2$, is adjusted to a value slightly less than that applicable to the first circuit 30. A zero-crossing detector 32 receives at its input $e_{32}$ the symmetrical triangular wave signals from output $s_{301}$ of circuit 30. At its output $s_{32}$ it generates a signal $V_{32}$ which assumes a fixed positive value when the generating sawtooth is positive and a value of zero in the opposite case. This signal is thus a symmetrical square-wave signal which is out of phase by 90° with the generating sawtooth. A synchronising device 333 shown in broken lines in FIG. 3 is responsible for synchronising circuit 31 with signal $V_{32}$ in the manner described below. Via resistors $R_3$ and $R_4$ respectively, signal $V_{32}$ controls the bases of transistors $T_3$ and $T_4$ which become conductive when signal $V_{32}$ is positive. Two diodes $d_5$ and $d_6$ have their anodes respectively connected to the emitter of $T_3$ and the collector of $T_4$ and their commoned cathodes are connected to output $s_{312}$ of circuit 31. The collector of $T_4$ is connected on the one hand to the positive pole of the supply source via a resistor $R_6$, and on the other hand to output $s_{311}$ of circuit 31 via a diode $d_7$ whose cathode is connected to output $s_{311}$ of circuit 31. This output $s_{311}$ is connected to the negative or zero potential side of the supply source via a capacitor $C_4$ and to the collector of transistor $T_3$ via a resistor $R_7$.

There are two possible states in operation. The first occurs when the voltage $V_{31}$ at output $s_{312}$ of circuit 31 is positive and transistor $T_4$ is blocked, that is to say when voltage $V_{32}$ is zero. Capacitor $C_4$ charges rapidly through $R_6$ and $d_7$.

The second state occurs when the voltage $V_{31}$ at output $s_{312}$ of circuit 31 is zero and transistor $T_3$ is conductive, that is to say when voltage $V_{32}$ is positive. Capacitor $C_4$ discharges rapidly through resistor $R_7$, transistor $T_3$ and diode $d_5$.

FIG. 4 shows the behaviour as a function of time of the voltages $V_{30}$, $V_{32}$, $V_{31a}$ and $V_{31}$ which are respectively received at output $s_{301}$ of circuit 30, output $s_{32}$ of the zero crossing detector 32, the first output $s_{311}$ of circuit 31, and the second output $s_{312}$ of the same circuit 31. In cases where voltages $V_{32}$ and $V_{31}$ are positive, voltage 31a increases linearly. Since the frequency of the signals from circuit 31 is less than that of the signals emitted by circuit 30, at the moment when the voltage $V_{32}$ drops to zero the charge in capacitor $C_4$ will not have reached its triggering value and $V_{31}$ will remain positive. Capacitor $C_4$ charges quickly and voltage $V_{31a}$ swiftly rises to its reversal threshold. Voltage 31 drops to zero and voltage $V_{31a}$ decreases linearly. At the moment when voltage $V_{32}$ becomes positive again, voltage $V_{31a}$, for the same reason as before, has failed to reach its reversal threshold and voltage $V_{31}$ remains at zero. Capacitor $C_7$ discharges quickly, voltage $V_{31a}$ reaches its reversal threshold, voltage $V_{31}$ becomes positive, voltage $V_{31a}$ rises linearly, and the cycle begins again.

Since the sinusoidal signals received from output $s_{303}$ of circuit 30 and output $s_{313}$ of circuit 31 are in phase with the triangular wave signals from outputs $s_{301}$ and $s_{311}$ respectively, they are out of phase with one another by 90° and their frequency which is identical, is proportional to the control voltage $V_2$. They are applied to the respective inputs $e_{322}$ and $e_{332}$ of the amplifiers 32 and 33 whose gain is proportional to the control voltage $V_2$. At the outputs of the amplifiers are obtained two sinusoidal voltages $V_{a1}$ and $V_{a2}$ which are out of phase by 90° and whose frequency and amplitude are proportional. These voltages are then applied to power amplifiers 4 and 5.

Each amplifier stage 4 and 5 is in two sections; a preamplifier and a power amplifier proper.

FIG. 5 shows an embodiment of one of the preamplifiers, namely that referenced 6. The other is identical to the first and is shown as a rectangle marked 7.

The sinusoidal voltages $V_{a1}$ and $V_{a2}$ supplied by the function generator are applied to input $e_6$ of pre-amplifier 6 and input $e_7$ of pre-amplifier 7 respectively. The signals received from the outputs ends are respectively $Q_1$ and $\overline{Q}_1$, and $Q_2$ and $\overline{Q}_2$.

Pre-amplifier 6 consists of an adder 8, a zero-crossing detector 9, an amplifier 10 and a threshold detector 11. FIG. 6 shows the behaviour of the various signals as a function of time. The adder 8 receives at a first input $e_{81}$ the sinusoidal voltage $V_{a1}$ and at its second input $e_{82}$ a master saw-tooth voltage $V_{12}$ supplied by a generator 12. The frequency of this sawtooth voltage is very much higher than the maximum frequency of the sinusoidal voltage $V_{a1}$ to be amplified. As an esample, which is in no way limiting, the frequency adopted may be of the order of 1 Khz with a signal to be amplified of the order of 40 Hz. In addition, the amplitude of this sawtooth voltage is proportional to the voltage of the DC supply source for the arrangement.

At its output $S_8$ the adder 8 supplies a voltage $V_8$ which is the algebraic sum of the two voltages $V_{12}$ and $V_{a1}$ defined above. The zero-crossing detector 9 receives this voltage $V_8$ at its input $e_9$ and converts it into a voltage $V_9$ which is emitted from its output $s_9$. When the output voltage $V_8$ from adder 8 is greater than zero, the output voltage $V_9$ from the zero-crossing detector 9 assumes a fixed positive value. It assumes a fixed negative value in cases where input voltage $V_8$ is less than zero. This voltage $V_9$ is applied to a first input $e_{101}$ of the amplifier 10, which emits on the one hand, from a first output $s_{101}$, a positive voltage $Q_1$ of fixed amplitude when its input voltage $V_9$ is positive and a voltage of amplitude zero in the reverse case, and on the other hand, from its second output $s_{102}$, a tension $\overline{Q}_1$ which is complementary to $Q_1$, that is to say which is of a fixed positive amplitude when the voltage of $Q_1$ is zero and is of zero amplitude in the reverse case. These thus exists a train of pulses whose lengths are modulated in harmony with the sinusoidal input voltage. This amplifier 10 is fed with an auxiliary voltage V which is applied to a second input $e_{102}$, so that in the absence of this voltage V the output voltages $Q_1$ and $\overline{Q}_1$ are both zero. As shown in FIG. 6, which shows the various voltages $V_{a1}$, $V_{12}$, $V_8$, $V_9$, $Q_1$ and $\overline{Q}_1$ as a function of time, at the moment when the sinusoidal voltage passes through zero, the signal emitted from output $Q_1$ or $\overline{Q}_1$ is symmetrical, that is to say the length of time for which it is positive. This symmetry is increasingly lost as the amplitude of the sinusoidal signal $V_{a1}$ becomes greater. The deviation from symmetry is termed the depth of modulation. The latter also depends on the amplitude of the master voltage $V_{12}$, which is itself proportional to the voltage of the DC supply source for the arrangement. It can be seen from FIG. 6 that the depth of modulation is the less as the amplitude of the master sawtooth is higher, that is to say as the voltage of the supply source for the arrangement is higher; this enables to compensate for variations in the supply voltage to the arrangement.

The pre-amplifier 6 is supplemented by a threshold detector 11 which receives at its input $e_{11}$ a control voltage $V_i$ which is proportional to the current flowing in the power transistors of a power amplifier which will be described below. As soon as this current reaches a predetermined value, the threshold detector 11 emits a message from its output $s_{11}$, in the form of a signal which is transmitted to input $e_{103}$ of amplifier 10 and which blocks the latter. The output voltages $Q_1$ and $\overline{Q}_1$ then both become zero.

To enable the power amplifier which will be described below to operate properly, it is necessary to arrange for a dead period each time the signal $V_9$ supplied by the zero-crossing detector 9 changes direction. The structure which is illustrated in FIG. 7 and described below, and which forms a preferred modified embodiment of the combination of the adder 8 and the zero-crossing detector 9, enables this to be done. In this embodiment, a narrow pass-band operational amplifier 14 is used. The voltages $V_{a1}$ and $V_{12}$ are applied to the input $e_{14}$ of this amplifier 14 via resistors $R_1$ and $R_2$ respectively. The output $s_{14}$ of amplifier 14 is connected to a load resistor $R_3$ via two Zener diodes $Z_1$ and $Z_2$ which are connected back to back. The resistors $R_1$ and $R_2$ form the algebraic sum of the voltages $V_{a1}$ and $V_{12}$. Amplifier 14 is used as a zero crossing detector. By virtue of the narrow pass-band of the amplifier, the output voltage 14 produced at its output $s_{14}$ is of the trapezoidal shape shown in FIG. 8.

The presence of the Zener diodes $Z_1$ and $Z_2$ means that the output voltage across the terminals of load resistor $R_3$ remains at zero as long as the absolute value of the amplitude of voltage $V_{14}$ remains less than the Zener voltage $V_Z$ of the diodes. The trapezoidal signal $V_9$, with so called "dead" periods $t_1$, is shaped in the remainder of the amplifier to obtain steeply-rising leading edges at outputs $V_Q$ and $V_{Q\overline{1}}$.

FIG. 9 shows an embodiment of one of the power amplifiers, such as that which is reference 4, for example. Amplifier 5 is produced in the same way. Each of these amplifiers consists in essence of:

a transistor $T_1$ whose emitter on the one hand is connected to the negative pole of a DC supply source 15, which may be a bank of accumulators, and whose collector on the other hand is connected to the cathode of a diode $d_1$, a diode $d_3$ whose cathode is coupled to the anode of diode $d_1$ and whose anode is connected to the emitter of transistor $T_1$, a transistor $T_2$ which is connected in the same way as transistor $T_1$, that is to say its emitter is connected to the negative terminal of the supply bank 15 and its collector is connected to the cathode of a diode $d_2$, a diode $d_4$ whose cathode is connected to the anode of diode $d_2$ and whose anode is connected to the emitter of transistor $T_2$, a current-transformer $T_I$ which has two identical primary windings 16 and 17 whose inputs are marked $e_{16}$ and $e_{17}$ respectively and whose outputs $s_{16}$ and $s_{17}$ respectively, and a secondary winding 18 whose input and output are marked $e_{18}$ and $s_{18}$, an inductance L having two identical windings 19 and 20 which have inputs $e_{19}$ and $e_{20}$ and outputs $s_{19}$ and $s_{20}$, a transformer $T_R$ which comprises on the one hand a primary winding 21 having an input $e_{21}$ and an output $s_{21}$ and a centre tapping m, and on the other hand a secondary winding 22 having an input $e_{22}$ and an output $s_{22}$.

Input $e_{16}$ of transformer $T_I$ is connected to the common point $P_1$ of the anode of diode $d_1$ and the cathode of $d_3$. The output $s_{16}$ of this transformer $T_I$ is connected to input $e_{19}$ of the inductance L. The output $s_{19}$ of the latter is connected to input $e_{21}$ of the primary winding 21 of transformer $T_R$. In a similar fashion, the output $s_{21}$ of transformer $T_R$ is connected to input $e_{20}$ of inductance L and output $s_{20}$ of inductance L is connected to input $e_{17}$ of transformer $T_1$. Finally, the output $s_{17}$ of transformer $T_1$ is connected to the common point $P_2$ of the anode of diode $D_2$ and the cathode of diode $d_4$.

The centre point m of transformer $T_R$ is coupled to the positive terminal of the supply source 15. A high value capacitor $C_1$ is connected between the centre point m and the common point $P_3$ of the emitters of transistors $T_1$ and $T_2$ and ensures a reserve of energy. Finally, a capacitor $C_2$ is connected across the outputs $e_{22}$ and $s_{22}$ of the secondary winding 22 of transformer $T_R$. The output terminals are marked $S_1$ and $S_2$.

The bases 23 and 24 of transistors $T_1$ and $T_2$ are respectively controlled by the voltages $V_Q$ an $V_{\overline{Q}}$ supplied by the preamplifiers.

An amplifier such as is described above and illustrated in FIG. 9 operates as follows:

The first case which will be considered is that in which the input signal to the pre-amplifier 6 is zero. The complementary signals Q and $\overline{Q}$ are symmetrical. The transistors $T_1$ and $T_2$ are rendered alternately conductive and blocked for equal lengths of time. Assuming that $T_1$ is conductive, a current flows from the positive pole of source 15 through the section of winding lying between the centre point m and transformer $T_R$ and the input $e_{21}$ of its primary winding 21, and also through winding 10 of inductance L, winding 16 of transfromer $T_I$, diode $d_1$, and transistor $T_1$. The current flows through each winding in the direction from its output to its input. At the moment when $T_1$ blocks, this current has reached a certain peak value $I_1$ max., as FIG. 10 shows, which illustrates the function with respect to time of the voltages Q and $\overline{Q}$ and of the current flowing in the various components (transistor $T_1$, diode $d_3$, transformer $T_R$ and the supply source 15).

Since the current in an inductance cannot change instantaneously and in view of the direction of the windings of the inductance, a current $I_2$ max. of the same value as $I_1$ max. is set up in the output to input direction through diode $d_4$. This current is supplied to the source 15. The energy previously stored in inductance L is thus recovered. It should be noted that, althouth transistor $T_2$ is driven to conduct, since diode $d_4$ is conductive, there is at its terminals a slightly negative voltage and this blocks diode $d_2$. The current declines and reaches zero after approximately a quarter of a cycle, when all the energy has been drained from the inductance. At this moment diode $d_4$ blocks and diode $d_2$ becomes conductive. A current arises in the input to output direction in windings 17 and 20, via diode $d_2$ and transistor $T_2$. This current increases and reaches a maximum value $I_3$ max. at the moment when $T_2$ blocks. The current is supplied by the supply source 15. Inductance L has thus stored energy. At this moment diode $d_3$ becomes conductive, until the next quarter of a cycle, when transistor $T_1$ and diode $d_1$ take their turn and the cycle continues. This manner of operation, which is illustrated by the waveforms shown in FIG. 10, causes currents $I_B$ whose mean is zero to appear in the source 15 and in the primary winding of transformer $T_R$. The residual ripple is filtered by capacitor $C_2$. The output voltage $V_4$ at terminals $S_1$ and $S_2$ is thus zero.

The second case to be considered is that of operation with an input signal which is other than zero, (one which is positive for example). FIG. 11 illustrates operation in this case.

Transistor $T_1$, for example, is conductive for a longer time than transistor $T_2$. At the moment when transistor $T_1$, blocks, the current reaches a higher I max value. As before, diode $d_4$ becomes conductive and the current declines but in this case transistor $T_1$ is made conductive again before the current has dropped to zero and it is thus only transistor $T_1$ and its associated diodes which perform an active function. It would be transistor $T_2$ and its associated diodes which would perform an active function if the control signal were negative. This operation, which is illustrated in FIG. 8, causes currents of other than zero mean value to appear in the primary of transformer $T_R$ and a current $I_B$ to appear in the supply source 15. The mean current $I_M$ in the primary of the transformer is positive in FIG. 11 but would be negative in the case of a negative input signal $V_{a1}$.

The third case to be considered is that of operation with a sinusoidal input signal. As explained above, the signals $V_Q$ and $V_{\overline{Q}}$ controlling the transistors $T_1$ and $T_2$ then have their lengths modulated in harmony with the sine-wave. The result is that the mean current in the primary winding of the transformer waries in the same rhythm, that is to say sinusoidally. Capacitor $C_2$ filters in residual ripple and there is obtained at outputs $S_1$ and $S_2$ a sinusoidal voltage which is a replica of the input signal $V_{a1}$. Since dead periods have been arranged in the signals controlling transistors $T_1$ and $T_2$, there is no danger of these conducting simultaneously.

A voltage which is a replica of the current flowing in the transistors is received at terminals $e_{18}$ and $s_{18}$ of transformer $T_1$. This voltage is used as a control voltage for the threshold detector 13 of pre-amplifier 6. As soon as the current in one transistor reaches a predetermined value, the threshold detector 13 triggers and blocks transistors $T_1$ and $T_2$. The latter are thus fully protected against all overloads. In particular, the arrangement is able to operate perfectly well with a short circuit between terminals $S_1$ and $S_2$ and the normal voltage will reappear as soon as the short circuit is no longer present. The description would be identical in the case of amplifier 5, from whose terminals a voltage $V_5$ is received.

In cases where it is desired to obtain a three-phase signal, the output transformer $T_R$ is replaced by a transformer of the "Scott-connected" or "Leblanc-connected" type which converts the two-phase signal into a three-phase signal.

In a modified embodiment, what is termed an auxiliary arrangement is provided. This is illustrated in FIG. 12. As stated above, the pre-amplifier is fed by an auxiliary voltage V. The absence of this voltage prevents the power amplifier from operating in any way. The object of the auxiliary arrangement marked A in FIG. 12 is to allow the auxiliary voltage to be applied under certain conditions. The auxiliary arrangement A consists of:

a first threshold system 50, to whose input $e_{50}$ is applied the voltage E from the supply battery 15. The system opens a first contact 51 when this voltage E is higher than a predetermined value, a voltage converter 52 which produces an auxiliary voltage V from the supply voltage, a second threshold system 53 which, being supplied by the auxiliary voltage V, opens a second contact 54 as soon as this voltage V is higher than a predetermined value V mini, an $R_C$ circuit ($R_{50}$, $C_{50}$) which is supplied by a voltage $V_1$, a third threshold system 55 which, being supplied by the voltage $V_c$ which exists across the terminals of capacitor $C_{50}$, closes a third contact 56 as soon as the voltage V reaches a predetermined value. When closes, this third contact 56 applies the voltage V to amplifiers 6 and 7, which allows the associated power amplifiers 4 and 5 to operate.

Such an auxiliary arrangement operates in the manner described below.

As soon as the supply voltage E is applied, all the stages of the system have a supply except the pre-amplifier stages, and the power amplifier stages are thus blocked. If the supply voltage E is sufficiently high (in the present instance if it is higher than E mini) the first contact 51 opens and if the voltage V at the output of converter 52 is sufficiently high (higher than V mini), the second contact 54 opens. Capacitor $C_{50}$ then charges via resistor $R_{50}$. After a certain delay, the voltage at the terminals of capacitor $C_{50}$ reaches the triggering value for threshold system 55, which closes contact 56. The preamplifiers 6 and 7 are fed with the auxiliary voltage V. The system is unblocked.

Such an arrangement has a number of advantages. When voltage is applied, the delay which the arrangement causes before the power amplifier stages come into operation enables all the components making up the control arrangement according to the invention to reach their steady state during this period. There is thus no danger of transitional conditions existing at the time when the power transistors unblock. The arrangement also performs a safety function by blocking the control arrangement when the supply voltage E is too low, in cases where the accumulator bank is discharged for example, and it protects the power transistors against any thermal runaway, of which there would be a danger if the auxiliary voltage were too low.

In the example descirbed, the power transistors are of the NPN type. They could be of the PNP type but in this case the polarities would have to be reversed.

An application of a control arrangement such as that which has just been described, both from the point of view of structure and operation, consists in using the arrangement as a system for driving a brushless and slip-ringless asychronous two-phase or three-phase motor to enable the said motor to operate at continuously variable speeds, the motor being supplied at a variable frequency and at a voltage which is continuously adjusted as a function of the said frequency. The control arrangement operates correctly whatever the power factor cos Q of the load. This is of advantage where the load is formed by one or more asynchronous motors which are used at varying speeds since the power factor of such motors varies as a function of speed. The waveform, amplitude and frequency of the output voltage depend only on the parameters which govern the voltage $V_a$ applied to the input of the power amplifiers. This latter is generated at low power. Finally, since the power transistors are either saturated or blocked, losses are low and despite the sinusoidal waveform of the output voltage, the efficiency is excellent.

As stated above the switching function in the amplifier stages is performed by power transistors. Such a circuit is particularly suitable for use with moderate supply voltages of the order of 100 volts. This is the case in particular when the supply source is formed by a bank of accumulators. But for example, in cases where an AC supply source is available, such as a mains distribution network by employing a rectifier for the purpose, and it become difficult to use this control arrangement with transistors for very high power levels. To overcome this disadvantage embodiment is now described in FIG. 13 where transistorised power stages are designed to operate with thyristors.

The control arrangement is in all respects similar to that described with regard to the power stage, the amplifiers of which, have undergone certain modifications required as a result of the replacement of the power transistors by thyristors. Therefore, all that will be described below is the layout of one power amplifier.

The supply source, which may be either a DC source (banks of accumulators) or a rectified AC source (originating from the mains distribution network for example) is represented in the figure by its positive and negative terminals. In an embodiment which is given solely by way of example, the amplifier according to the invention consists in essence of:

two thyristors $TH_1$ and $TH_2$ which receive at their control electrodes the control signals $V_Q$ and $V_{\bar{Q}}$ respectively which are supplied by their associated pre-amplifiers these thyristors having their cathodes connected in common on the one hand to a point $P_a$ and on the other hand, via a so-called blocking thryristor $TH_3$, a point $P_b$, an inductance $L_3$ and a diode $d_5$, to the point $P_a$ and on the other hand, via a so-called blocking thyristor $TH_3$, a point $P_b$, an inductance $L_3$ and a diode $d_5$, to the point $P_a$ and on the other hand, via a so-called blocking thyristor $TH_3$, a point $P_b$, an inductance $L_3$ and a diode $d_5$, to the positive terminal of the supply source. The anodes of the thyristors are in turn connected, via a diode $d_3$ in the case of $TH_1$ and a diode $d_4$ in the case of $TH_2$, to the negative terminal of the supply source.

an inductance $L_2$ which is connected between point $P_a$ and the negative pole of the supply source, a capacitor $C_3$ which is connected between point $P_b$ and the negative pole of the supply source.

The inductances $L_2$ and $L_3$, the capacitor $C_3$, the diode $d_5$ and the thyristor $TH_3$ form a blocking circuit.

The thyristors and their associated diodes and the blocking circuit co-operate with the other components of the amplifier, which are the same as in preceding embodiment, to supply the control voltages. The components concerned are:

a current transformer $T_I$ which has two identical primary windings 16 and 17 whose inputs are marked $e_{16}$ and $e_{17}$ respectively and whose outputs are marked $s_{16}$ and $s_{17}$ respectively, and which has a second winding 18 whose input and output are marked $e_{18}$ and $s_{18}$, an inductance $L_1$ which has two identical windings 19 and 20 which have inputs $e_{19}$ and $e_{20}$ and outputs $s_{19}$ and $s_{20}$, a transformer $T_R$ which has on the one hand a primary winding 21 having an input $e_{21}$ and an output $s_{22}$ and a centre point m, and on the other hand a secondary winding 22 having an input $e_{22}$ and an output $s_{22}$.

In accordance with the invention, the input $e_{16}$ of the transformer is connected to the common point $P_1$ of the cathode of diode $d_3$ and of the anode of thyristor $TH_1$. The output $s_{16}$ of transformer $T_1$ is connected to the input $e_{19}$ of inductance $L_1$. The output $s_{19}$ of the latter is connected to the input $e_{21}$ of the primary winding 21 of transformer $T_R$. In a similar manner output $s_{21}$ of transformer $T_R$ is connected to input $e_{20}$ of inductance $L_1$ and the output $s_{20}$ of the latter is connected to input $e_{17}$ of transformer $T_I$. Finally, the output $s_{17}$ of transformer $T_I$ is connected to the common point $P_2$ of the cathode of diode $d_4$ and of the anode of thyristor $TH_2$.

The centre point m of transformer $T_R$ is coupled to the positive terminal of the supply source. A high value capacitor $C_1$ is connected between the source point m and the negative terminal of the supply source. Finally, a capacitor $C_2$ is connected across input $e_{22}$ and output $s_{22}$ of the secondary winding 22 of transformer $T_R$. The output terminals of the amplifier are marked $S_1$ and $S_2$.

The control electrodes of thyristors $TH_1$, $TH_2$ and $TH_3$ receive control pulses which are generated from the output signals of the pre-amplifier associated with the amplifier concerned.

When voltage is applied, capacitor $c_3$ charges to a voltage close to twice the supply voltage, which is achieved by means of the oscillating circuit $L_3$, $C_3$. From this moment on, the operation of the amplifier is the same as in the case of preceding embodiment: which one exception, namely that unlike the transistors, the thyristors have to be blocked. This blocking function is performed by triggering thyristor $TH_3$ by means of a control pulse applied to its control electrode 100. At this moment capacitor $C_3$ discharges through inductance $L_2$ and the thyristor, which was in the conductive state, shuts off, since the polarities at its terminals are reversed.

A control arrangement which has been equipped in this way with thyristorised power amplifiers enables asynchronous motors to be driven at frequencies other than the frequency of the $A_C$ supply source (the mains for example) and in particular at high frequencies. This enables the size of the output transformers and the motors employed to be reduced.

In the case of supersynchronous operation, the system recovers electrical energy, provided a component capable of storing this energy has been provided for the purpose. When the motor is braked the energy can then be collected either in a battery or in a high-capacity capacitor.

As stated above, the invention thus also has as an object a systeme for driving an asychronous motor supplied from a DC voltage source at speeds which are continuously variable. More specifically, it relates to an electronic control arrangement which receives at its input converted control information and which emits from its output, as a function of the said information, a so-called output signal whose voltage and frequency are controlled simultaneously and are so controlled in a continuous fashion, which signal is thus capable of regulating the speed of the said motor as a function of the control information. The input signal takes the form of a first DC control voltage which is supplied either by a potentiometric circuit or by a mixing arrangement which is capable of combining items of control information and emitting a signal. The latter, when applied to the input of a system according to the invention for providing a drive at continuously variable speeds and which co-operates with an asynchronous motor, enables the speed of the motor to be related to the said items of information. One application of such a combination is described below by way of entirely non-limiting example.

It relates to the ventilation of an enclosure, such as a railway coach, used for transporting passengers. Ventilation is achieved by blowing into the coach a mixture of air consisting partly of air drawn from the exterior, by means of motorised blowers. Since the coach may move either in tunnels, where the temperature is substantially constant, or in the open where the temperature varies with the season, it is desirable for the environment experienced by the passengers to be, at all times of the year, matched on the one hand to the mean temperature in the coach and on the other hand to the temperature of the outside air. One solution to this problem consists in using bladed blowers which are driven round at varying speeds by means of asynchronous motors, of the two-phase type for example, which are equipped with a variable-speed drive-system or systems according to the invention. By turning at a speed between 0 and N revolutions per minute, these motors thus provide a variable supply of air. The air so pumped contains approximately 40% of fresh air taken from the exterior. The physiological sensation felt by the passengers depends on the mean temperature prevailing within the coach, the output of air from the blowers, and the difference between the temperature of the air blown in and that of the ambient air. The higher air speeds give the sensation of a cool breeze, which is desirable when temperatures are high but which is to be avoided when temperatures are low. The control data will thus be formulated from the following parameters:

(a) the temperature prevailing within the coach. It will in fact be decided that between two temperature limits $\theta_1$ and $\theta_2$, the speed of rotation should be between 0 and $N_O$ rpm respectively. Thus, each temperature $\theta_a$ between $\theta_1$ and $\theta_2$ will have a corresponding speed $N_A$, (b) the outside temperature, since as a function of the latter the speed of rotation will have to be either reduced or increased by a greater or smaller amount N rpm in relation to the said initially determined speed $N_A$.

Conversely, it is possible for the outside temperature to be taken as the reference temperature and for the speed then to be regulated as a function of the inside temperature. These parameters are processed by a mixing arrangement which emits a first control voltage $V_1$.

FIG. 14 shows the addition of such a mixing arrangement 1, which receives at its input information supplied by two resistive sensors A and B and which emits an output signal $V_1$, and thus co-operates with the control arrangement or system for driving a motor at variable speeds, which comprises a block 2 for processing the control voltage $V_1$, a function generator 3 and two amplifiers 4 and 5, the structures of which were described above.

FIG. 15 shows an embodiment of the mixing arrangement 1. The sensor positioned inside the vehicle and the sensor positioned outside both consist of a number of components which are grouped into two blocks A and B which are enclosed in broken lines in the figure. The description will first concentrate on the sensor A situated inside the vehicle. A resistive temperature-sensing element 50 is positioned in a first Wheatstone bridge formed by resistors $R_{50}$, $R_{52}$ and $P_{50}$. The voltage received at the terminals of this bridge is applied via two input resistors $R_{53}$ and $R_{54}$ to an operational amplifier 51 which has a negative feed-back impedance $R_{51}$.

The signal is received at the output of operational amplifier 51 in the form of a voltage $V_a$. This corresponds to the signal $V_A$ applied to the mixing arrangement 1 in FIG. 14. Similarly, the sensor B positioned inside the vehicle includes a resistive temperature-sensing element 60 which is positioned in a second Wheatstone bridge formed by resistors $R_{60}$, $R_{62}$ and $P_{60}$. The voltage obtained at the terminals of this bridge is applied via two input resistors $R_{63}$ and $R_{64}$ to an operational amplifier 61 which has a negative feedback impedance $R_{61}$ and which emits a signal in the form of a voltage $V_B$ whose sign is opposite from that of $V_A$. This signal corresponds to the signal $V_B$ applied to the mixing arrangement in FIG. 14. If $V_A$ is positive for example, $V_B$ is negative. The potentiometers $P_{50}$ and $P_{60}$ enable the zero point to be adjusted. The value of voltage $V_A$ and voltage $V_B$ varies as a function of temperature $\theta$ as shown in figures 16 and 17. IN both cases only one range of temperatures is considered, which range lies between the temperatures $\theta_A$ and $\theta_B$ as already stated. The difference between voltages $V_A$ and $V_B$ is applied via resistors $R_{65}$ and $R_{66}$ to a first input $e_{671}$ of a first operational amplifier 67 which has a negative feed-back resistor $R_{67}$. The second input $e_{672}$ of the operational amplifier 67 is connected to zero potential via resistor 68. The signal emitted from the output $s_{67}$ of amplifier 67 is applied via a resistor $R_{70}$ to a system for symmetrical peak clipping which consists of diodes $d_{71}$ and $d_{72}$ and resistors $R_{73}$, $R_{74}$, $R_{75}$ and $R_{76}$. The signal, having been clipped in this way, is applied to one of the terminals of a potentiometer $P_{80}$ whose moving contact is connected via a resistor $R_{83}$ to the first input $e_{811}$ of an operational output amplifier 81 which has a negative feed-back resistor $R_{81}$. The second input $e_{812}$ of amplifier 81 is connected to zero potential via a resistor $R_{82}$. Input $e_{811}$ also receives the signal $V_A$ supplied by sensor A, via a potentiometer $P_{82}$. The signal $V_1$ supplied from output $s_{81}$ of amplifier 81 is a DC voltage proportional to the inside temperature, which is corrected for the difference between inside temperature and outside temperature within a certain limiting percentage.

The arrangement according to the invention forms a generator for generating power in the form of two out of phase sinusoidal voltages. The frequency and amplitude of these two voltages are proportional to a low-power DC control voltage. The original way of combining the components of which it consists means that the efficiency of such an arrangement is excellent, and makes it able to operate with loads of any power factor. The addition of active safety measures which react to low supply voltages, and to overloads which may be as great as a complete short circuit at the output of the apparatus, guarantees safe operation under all conditions. The two sinusoidal control voltages are produced at low power with a small amount of equipment. The special arrangement of the function generator prevents the direction of operation from ever reversing at the wrong time. The arrangement which provides the DC control voltage in accordance with the so-called "ramp" law specified above, ensures that the rise in speed is gradual with no current drain on the supply batteries. The system is switched on and off automatically and all transitional phenonema are prevented.

For all these reasons, the arrangement according to the invention is particularly suitable for the gradual and continuous control of the speed of asynchronous motorised blowers unsing a source of DC current such as a bank of accumulators. This continuous variation in speed enables the system to be controlled on the basis of physical parameters such as the inside and outside temperature applicable to a coach travelling on a railway for example.

What is claimed is:

1. An electronic control arrangement which receives at its input a first DC control voltage $V_1$ which is formulated on the basis of at least one control parameter, and delivering at its output, from a source of DC electrical energy, two sinusoidal voltages of the same frequency and amplitude which are 90° out of phase and whose frequency varies as a function of the said first control voltage and whose amplitude is at all times held proportional to the said frequency, comprising:
   a processing block which converts the said first DC control voltage $V_1$ into a second DC control voltage $V_2$. the curve of said second voltage $V_2$ rising linearly as a function of time;
   a function generator which receives at its input the said second DC voltage $V_2$ and which produces at its output first and second sinusoidal voltages $V_{a1}$ and $V_{a2}$ which are of the same frequency and amplitude but which are 90° out of phase with one another, the frequency and amplitude of the said sinusoidal voltages being proportional to the said DC control voltage $V_2$;
   first and second power amplifiers which contain first and second pre-amplifiers, respectively, which latter pre-amplifiers receive at their inputs the first and second sinusoidal voltages $V_{a1}$ and $V_{a2}$, respectively, and which cooperate with the said source of DC electrical energy so as to produce at their respective outputs the said sinusoidal control voltages; and
   an auxiliary arrangement for producing an auxiliary voltage V to supply the said preamplifiers, which arrangement co-operates with the amplifiers by blocking the operation of the said pre-amplifiers when the voltage from the said source of DC electrical energy falls below a certain threshold.

2. An electronic control arrangement according to claim 1, wherein the first and second power amplifiers are each formed by:
   a first transistor $T_1$ whose emitter is connected to the negative pole of the said energy source and whose collector is connected to the cathode of a diode $d_1$,
   a diode $d_3$ whose cathode is connected to the anode of diode $d_1$ at a common point $P_1$ and whose anode is connected to the emitter of transistor $T_1$,
   a second transistor $T_2$ whose emitter is connected to the said negative pole and whose collector is connected to the cathode of a diode $d_2$,
   a diode $d_4$ whose cathode is connected to the anode of diode $d_2$ at the common point $P_2$ and whose anode is connected to the emitter of the said transistor $T_2$,
   a current transformer $T_I$ which comprises on the one hand two identical windings 16 and 17 which have respective inputs $e_{16}$ and $e_{17}$ and respective outputs $s_{16}$ and $s_{17}$, and on the other hand a secondary winding 18 which has an input $e_{18}$ and an output $s_{18}$,
   an inductance L having two identical windings 19 and 20 which have inputs $e_{19}$ and $e_{20}$ respectively and outputs $s_{19}$ and $s_{20}$ respectively,
   a transformer $T_R$ which has on the one hand a primary winding 21 having an input $e_{21}$ and an output $s_{21}$ and a centre point m connected to the positive terminal of the said energy source, and on the other hand a secondary winding 22 having an input $e_{22}$ and at least one output $s_{22}$,
   a first capacitor connected between the said centre point m and the common point $P_3$ of the emitters of transistors $T_1$ and $T_2$,
   a second capacitor $C_2$ connected in parallel between $e_{22}$ and $s_{22}$, the input $e_{16}$ of transformer $T_I$ being connected to the said common point $P_1$, the output $s_{16}$ of this same transformer $T_I$ being connected to the input $e_{19}$ of the inductance, whose output $s_{19}$ is connected to input $e_{21}$ of transformer $T_R$, the output $s_{21}$ of the latter being connected to input $e_{20}$ of the inductance, whose output $s_{20}$ is in turn connected to input $e_{17}$ of transformer $T_I$, the output $s_{17}$ of the latter being connected to the said common point $P_2$, all these components co-operating with one another to emit the said sinusoidal voltages from the output terminals of each of said amplifiers.

3. An electronic control arrangement according to claim 1, wherein each of the said power amplifiers comprises:
   two thyristors $TH_1$ and $TH_2$ which have their cathodes connected together to a common point $P_a$ on the one hand, and on the other hand, via a blocking thyristor $TH_3$, a common point $P_b$, and inductance $L_3$, and a diode $d_5$, to the positive terminal of the supply source, their anodes being in turn connected, via a diode $d_3$ in the case of $TH_1$ and a diode $d_4$ in the case of $TH_2$, to the negative terminal of the said energy source,
   an inductance $L_2$ which is connected between point $P_a$ and the negative pole of the said source, and a capacitor $C_3$ which is connected between point $P_b$ and the same negative pole,
   a current transformer $T_I$ which has on the one hand two identical windings 16 and 17 which have respective inputs $e_{16}$ and $e_{17}$ and respective outputs $s_{16}$ and $s_{17}$, and on the other hand a secondary winding 18 having inputs $e_{18}$ and an output $s_{18}$,
   an inductance $L_1$ having two identical windings 19 and 20 which have inputs $e_{19}$ and $e_{20}$ respectively and outputs $s_{19}$ and $s_{20}$ respectively, a transformer $T_R$ having on the one hand a primary winding 21 with an input $e_{21}$ and an output $s_{21}$ and a centre point m connected to the positive terminal of the said energy source, and on the other hand a secondary winding 22 having an input $e_{22}$ and a least one output $s_{22}$, a first capacitor $C_1$ connected between the centre point m and the negative terminal of the supply source, a second capacitor $C_2$ connected in parallel between $e_{22}$ and $s_{22}$; the input $e_{16}$ of transformer $T_I$ being connected to the common point $P_1$, the output $s_{16}$ of transformer $T_I$ being connected to the input $e_{19}$ of inductance $L_1$, whose output $s_{19}$ is connected to input $e_{21}$ of transformer $T_R$, the output $S_{21}$ of the latter being connected to input $e_{20}$ of inductance $L_1$, whose output $s_{20}$ is in turn connected to input $e_{17}$ of transformer $T_J$, the output $s_{17}$ of the latter being connected to the common point $P_2$, all these components co-operating with one another to emit the said sinusoidal voltages at the output terminals of each of the said amplifiers.

4. An electronic control arrangement according to claim 1, wherein said generator comprises: first and second function generators which each emit symmetrical triangular-wave signals from their respective outputs $s_{310}$ and $s_{311}$, symmetrical square-wave signals from their respective outputs $s_{302}$ and $s_{312}$, and sinusoidal signals, a zero-crossing detector which converts the symmetrical triangular-wave signals emitted by the said first function generator into a symmetrical square-wave signals $V_{32}$ which is 90° out of phase with the symmetrical square-wave signal emitted by the said first function generator, and a synchronising arrangement which is formed by:

two resistors $R_3$ and $R_4$ which are connected on the one hand to the input of said zero-crossing detector and on the other hand to the bases of two transistors $T_3$ and $T_4$, two diodes $d_5$ and $d_6$ which have their anodes connected to the collector of $T_4$ and the emitter of $T_3$ respectively and their commoned cathodes connected to the output $s_{312}$ of the said second function generator, the collector of transistor $T_4$ being connected on the one hand to the positive pole of the said energy source via a resistor $R_6$ and on the other hand to the output $s_{311}$ of the said second function generator circuit via a diode $d_7$, the said output $s_{311}$ being connected to zero potential via a capacitor $C_4$ and to the collector of transistor $T_3$ via a resistor $R_7$, the said synchronising arrangement being responsible for synchronising the said second function generator with the said signal $V_{32}$.

5. An electronic control arrangement according to claim 1 further comprising a mixing arrangement which receives at its input at least two $D_C$ voltages $V_A$ and $V_B$ which are formulated on the basis of at least two control parameters, and which emits from its output the said first $D_C$ control voltage $V_1$.

6. A drive system comprising at least one electronic control arrangement according to claim 1 which co-operates with a motor having neither brushes or slip-rings by causing the speed of the latter to vary continously as a function of the said first DC control voltage.

7. A drive system according to claim 6, wherein said motor is a two-phase asynchronous motor.

8. A drive system according to claim 6, wherein said motor is a three-phase asynchronous motor.

9. An installation for ventilating an enclosure, of the type which includes a set of blades set in motion by at least one motor having neither brushes or slip-rings and equipped with a drive system according to claim 8.

10. An installation according to claim 10, wherein the temperature $\theta_A$ prevailing within the said enclosure forms one of the said control parameters and the temperature $\theta_B$ prevailing outside the said enclosure forms a second one of the said parameters, the said first control voltage $V_1$ then being proportional to one of the said temperatures when corrected for the difference which exists between the inside temperature $\theta_A$ and the outside temperature $\theta_B$.

11. An installation according to claim 10, wherein said enclosure is a coach intended for transporting passengers.

* * * * *